Patented Feb. 21, 1933

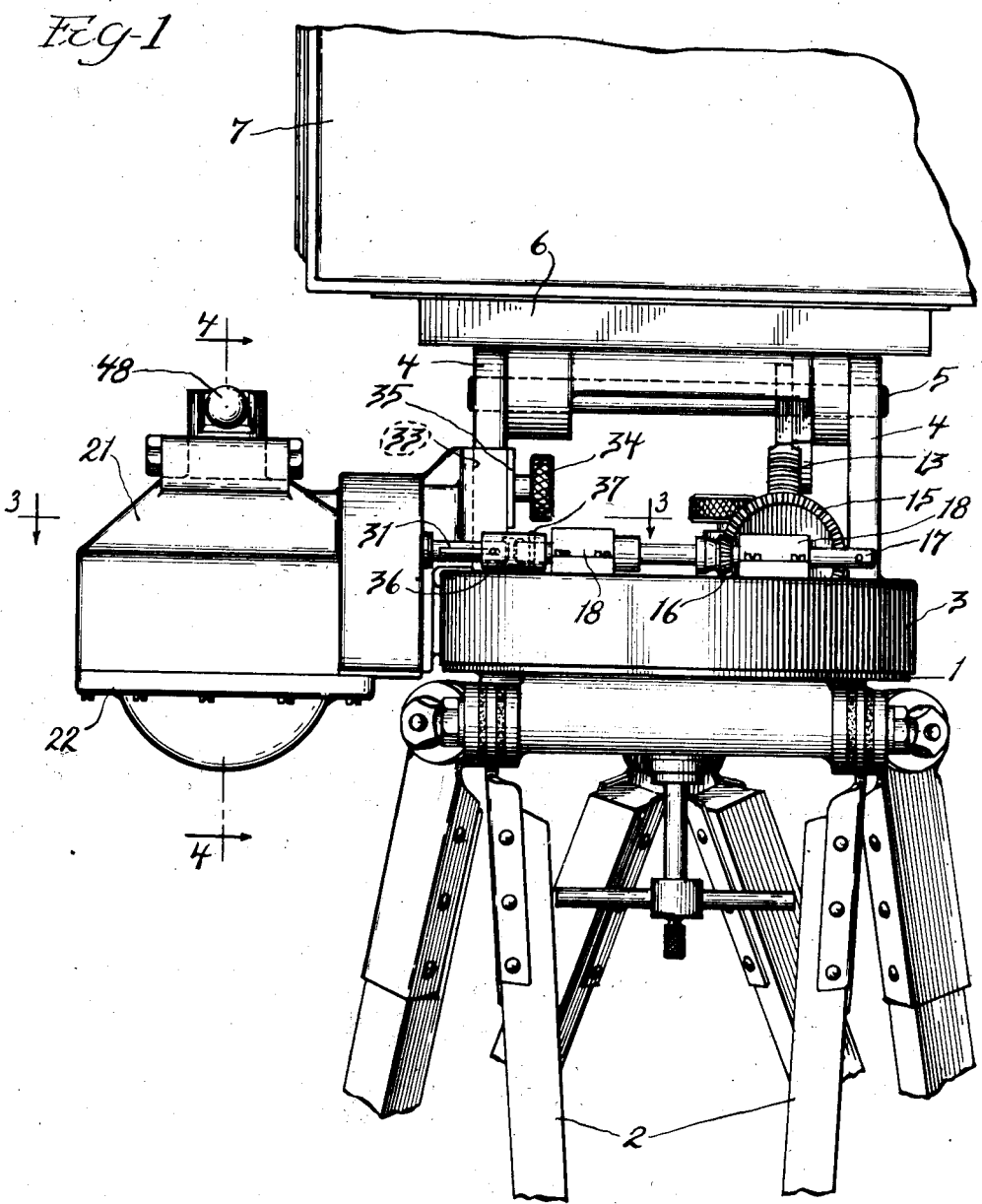

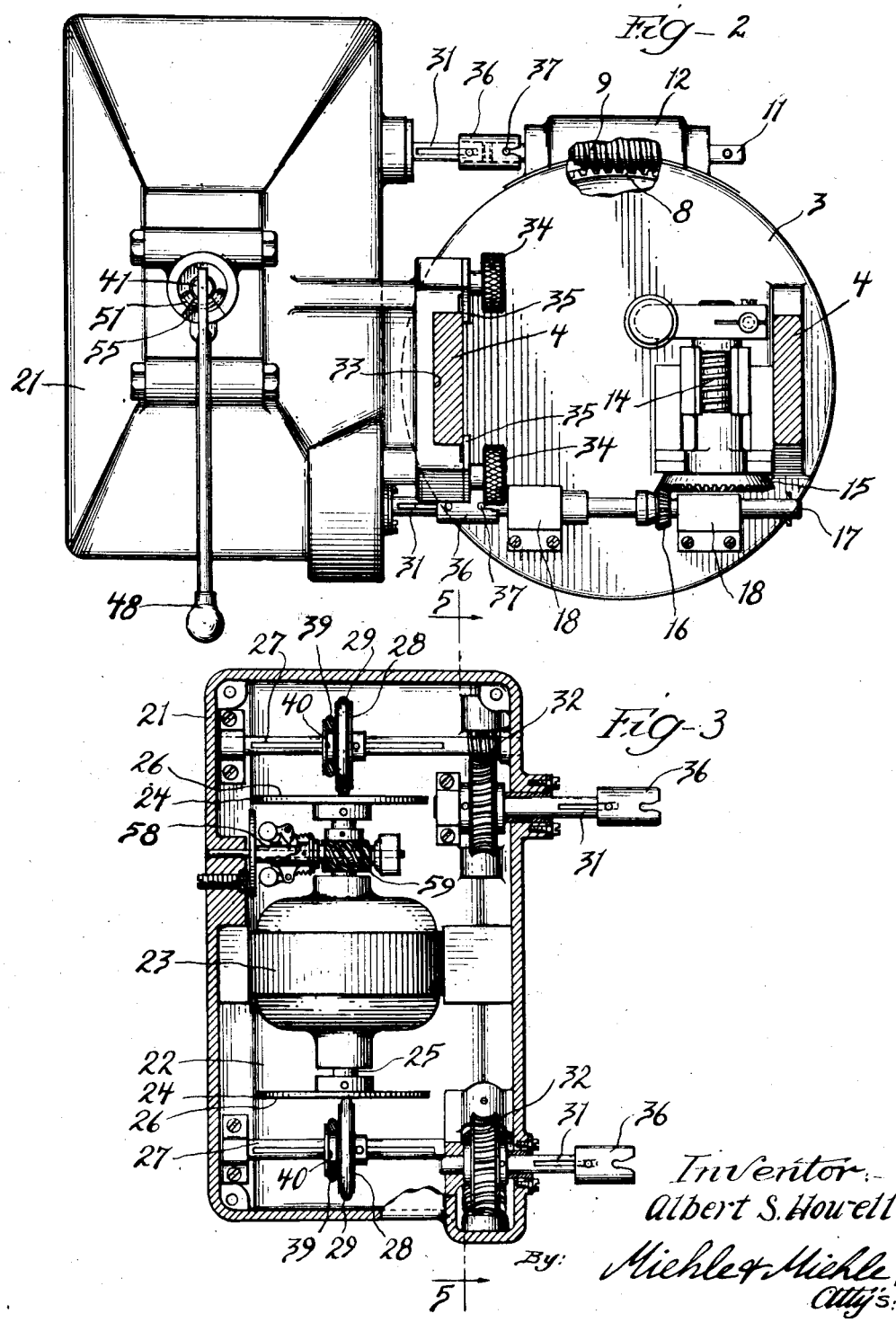

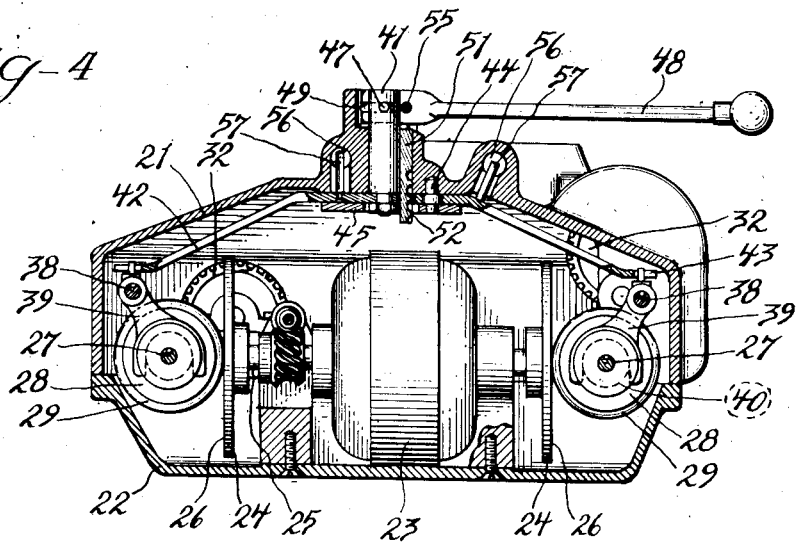
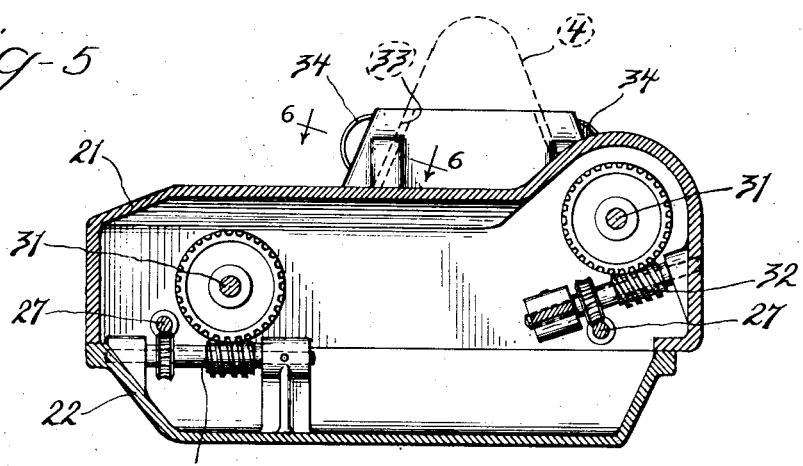
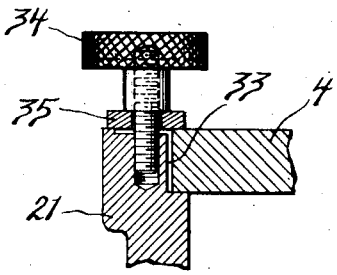

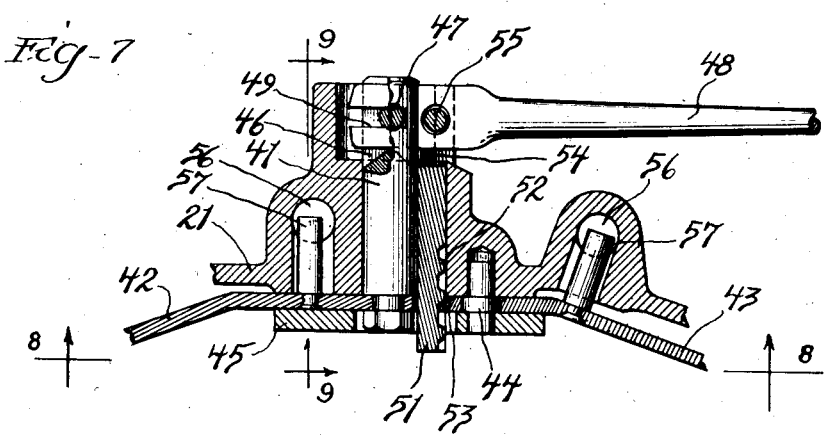
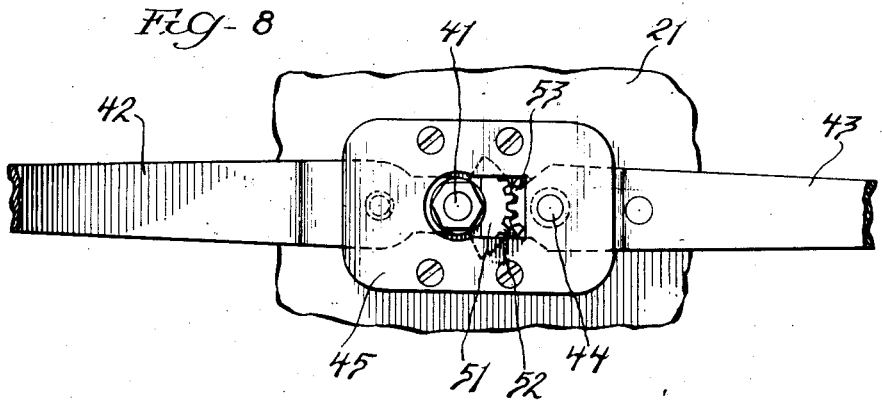
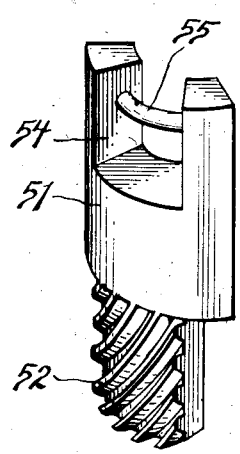
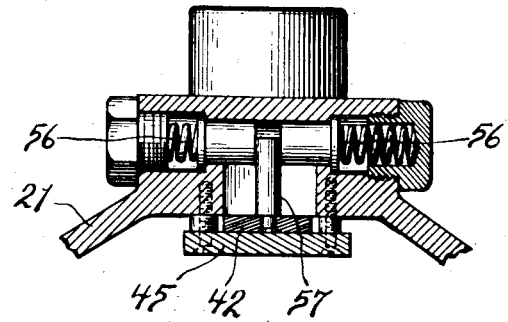

1,898,185

UNITED STATES PATENT OFFICE

ALBERT S. HOWELL, OF CHICAGO, ILLINOIS, ASSIGNOR TO THE BELL & HOWELL COMPANY, OF CHICAGO, ILLINOIS, A CORPORATION OF ILLINOIS

OPERATING MEANS FOR THE TRIPODS OF PHOTOGRAPHIC CAMERAS AND THE LIKE

Application filed September 15, 1928. Serial No. 306,272.

My invention relates particularly to means for operating the tripods of motion picture cameras although not limited to this use alone.

The general object of the invention resides in the provision of a simple and effective power driven, preferably electrically driven, operating means for the tripods of photographic cameras and the like, which is effectively, conveniently and naturally controlled, all with a view toward effecting smooth operation of the tripod at desired speeds both for panoraming and for vertical movement.

With this object in view my invention consists in certain features of novelty in the construction, combination and arrangement of parts by which the said object and certain other objects, hereinafter appearing, are effected, all as fully described with reference to the accompanying drawings and more particularly pointed out in the appended claims.

In the said drawings—

Figure 1 is a partial side elevation of a tripod having a motion picture camera mounted thereon and equipped with the operating means of my invention;

Figure 2 is a top plane view of the head of the tripod, with parts removed and broken away, and equipped as aforesaid;

Figure 3 is a partial section of the aforesaid operating means on the line 3—3 of Figure 1;

Figure 4 is a section on the line 4—4 of Figure 1;

Figure 5 is a section on the line 5—5 of Figure 3;

Figure 6 is a partial section on the line 6—6 of Figure 5;

Figure 7 is an enlarged partial section similar to Figure 4;

Figure 8 is a partial view on the line 8—8 of Figure 7;

Figure 9 is a partial section on the line 9—9 of Figure 7; and

Figure 10 is a perspective view of one of the parts of the mechanism, hereinafter described.

Like characters of reference indicate like parts in the several views.

Referring to the drawings, 1 designates the base of a tripod head which is supported as usual on folding legs 2. See Figure 1. Mounted on the base 1 for angular movement on a vertical axis is a turntable 3 which overlies the base and which is provided with diametrically opposite upwardly extending trunnion uprights 4. Mounted on the upper ends of the supports 4 for pivotal movement on a horizontal axis with respect to the turntable, as designated at 5, is a camera seat 6 upon the upper face of which a motion picture camera 7 is detachably secured.

The turntable 3 is operated on its axis with respect to the base 1 by means of a worm wheel 8 secured with the base and a worm 9 meshing with the worm wheel and secured on an operating shaft 11 which is revolubly mounted on a bracket 12 secured on the periphery of the turntable. See Figure 2.

The camera seat 6 is operated on its axis with respect to the turntable 3 by means of a worm wheel segment 13 secured with the seat, a worm 14 revolubly mounted on the turntable and meshing with the segment 13, a bevel gear 15 secured with the worm 14, and a bevel gear pinion 16 meshing with the gear 15 and secured on an operating shaft 17 journaled in bearings 18 secured on the turntable, the operating shafts 11 and 17 being parallel with the pivotal axis of the camera seat. See Figures 1 and 2.

The above described tripod is of a well known type to which the operating means of my invention is particularly adapted as an attachment, and requires no further description for the present purposes. Accordingly the said operating means will now be described.

The frame of the attachment is of the enclosing type and consists of an upper frame portion 21, forming the main portion of the enclosure of the frame and open at the bottom thereof, and a lower frame portion 22 secured to the bottom of the upper portion 21 and completing the enclosure thereof. See Figures 1 to 5 inclusive.

Disposed centrally within the enclosure of the frame and secured on the lower portion 22 is an electric motor 23 of a usual type, and friction members 24 are disposed at the ends of the shaft 25 of the motor within the enclosure of the frame and are secured with the motor shaft, these friction members being provided with axially outwardly facing friction faces 26 for purposes hereinafter appearing. See Figures 3 and 4.

A pair of parallel shafts 27 are revolubly mounted on the upper frame portion 21 and extend across the enclosure thereof and are disposed outwardly beyond respective of the friction members 24 in normal relation with the motor shaft 25. See Figures 3, 4, and 5.

A pair of friction wheels 28, provided with circumferential rims 29 of suitable friction material which afford circumferential friction surfaces, are keyed upon respective of the shafts 27 for movement therealong and are frictionally engaged with adjacent friction faces 26 of the friction members 24 for the driving of the shafts 27 from the motor shaft 25.

A second pair of parallel shafts 31 are disposed in parallelism with the shafts 27 and are revolubly mounted on the upper frame portion 21, and, extending through a side wall of the upper frame portion 21, project both on the inside and the outside of the enclosure of the frame.

The shafts 31 are driven from adjacent shafts 27 by means of worm reduction gear trains 32, of usual construction, disposed within the enclosure of the frame.

As shown the operating means is in the form of an attachment, and in consequence the following is provided.

The side wall of the upper frame portion 21 through which the shafts 31 extend is provided with a tripod turntable engaging formation which is inclusive of a vertical channel 33 adapted to embrace one of the trunnion uprights 4 of the turntable 3. See Figures 1, 2, 5 and 6. A pair of headed clamp screws 34 pass through clamp members 35 on opposite sides of the channel 33 for clamping the said trunnion upright 4 in the channel 33 whereby to detachably secure the operating means upon the turntable 3 of the tripod head.

When the operating means is so secured on the turntable 3, the shafts 31 are alined with respective of the operating shafts 11 and 17 on the turntable 3, and are secured therewith for driving the same by means of clutch collars 36 slidably keyed on the shafts 31 and engageable with usual transverse driving pins 37 on the shafts 11 and 17. See Figures 1, 2 and 3.

Thus, the operating means is provided with two driving trains from the motor 23 for independently operating the turntable 3 and the camera seat 6 of the tripod head.

It will be observed that adjustment of the friction wheels 28 along the shafts 27 varies the speed and reverses the direction of rotation of the friction wheels, thus providing for corresponding movement of the turntable 3 and the camera seat 6, the wheels 28 remaining stationary while the motor 23 is operating when the wheels 28 are disposed at the axis of the motor shaft 25 and friction members 24, as shown in Figure 3.

Thus, the means whereby the shafts 11 and 17 of the tripod head are driven is adapted for adjustment to vary independently the speed and to reverse the direction of rotation thereof, and in order that this adjustment may be conveniently controlled the following is provided.

A pair of parallel stationary shafts 38 are mounted on the upper frame portion 21 and extend across the enclosure thereof in adjacent parallelism with respective of the shafts 27, and keyed for sliding movement on respective of the shafts 38 are shifter members 39 which engage grooves 40 of adjacent friction wheels 28 for operating the same along the shafts 27. See Figures 3 and 4.

A vertical stud 41 is journaled in a bore through the top of the upper frame portion 21 and is disposed intermediately of the friction wheels 28. See Figures 4, 7 and 8. Secured on the lower end of the stud 41 for pivotal movement therewith and disposed within the enclosure of the frame is an arm 42, the free end of which is engaged with one of the shifter members 39 for operating one of the friction wheels 28 along its shaft 27 with pivotal movement of the stud 41 and arm 42.

A second arm 43, disposed within the enclosure of the frame, is pivotally mounted on a stud 44 disposed intermediately of the friction wheels 28 and in adjacent parallelism with the stud 41, and the free end of this arm is engaged with the other of the shifter members 39 for operating the other of the friction wheels 28 along its shaft 27 with pivotal movement of the arm 43.

The stud 44 engages in a bore of the top of the upper frame part 21, and the studs 41 and 44 and the arms 42 and 43 are held upwardly by means of a plate 45 underlying these arms and secured in spaced relation with the lower surface of the top wall of the frame portion 21, this lower surface of the top wall of the frame portion 21 limiting upward movement of the arms 42 and 43 and the studs 41 and 44.

The stud 41 projects upwardly of the top wall of the upper frame portion 21, and the upper end thereof is slotted on an axial plane thereof, as designated at 46. A pin 47 is secured on the stud 41 and extends across the slot 46, and a manually operated control handle 48 is engaged in the slot 46 and is provided with an end slot 49 embracing the pin 46. See Figures 4 and 7.

As so engaged with the stud 41 the handle 48 operates the stud 41 and arm 42 to operate the related friction wheel 28 along its shaft 27 with movement of the handle 48 in a horizontal plane or in a plane normal to the axis of the stud 41, but permits pivotal movement of the handle 48 vertically or on an axis normal to the stud 41 or pivotal axis of the arm 42, whereby the movement of the turntable 3 is controlled by corresponding horizontal movement of the handle 48.

A connecting member 51 is mounted on the top of the frame portion 21 alongside the stud 41 for sliding movement longitudinally of the axis of this stud, and is provided on its lower portion with rack teeth 52 disposed diagonally of the movement thereof, and which teeth are engaged with segment teeth 53 on the arm 43. See Figures 4, 7, 8 and 10. Consequently vertical movement of the connecting member 51 effects pivotal movement of the arm 43 to operate the related friction wheel 28 along its shaft 27.

The upper end of the connecting member 51 is provided with a slot 54 arranged correspondingly with an axial plane of the stud 41, and the control handle 48 extends through this slot, the slot being of sufficient width to permit the aforementioned horizontal movement of the handle for operative movement of the stud 41 and related parts.

A pin 55 is secured on the connecting member 51 and extends across the slot 54 and passes through an aperture through the control handle 48 whereby vertical pivotal movement of the handle 48, reacting on the aforementioned pin 47, effects vertical movement of the connecting member 51 and pivotal movement of the arm 43 to operate the related friction wheel 28 along its shaft 27.

The pin 55 is curved on the axis of the stud 41 so that the handle 48 may be pivoted horizontally or on the axis of the stud 41 and arm 42. See particularly Figure 10.

Thus is the single control handle 48 mounted for universal movement, and vertical movement of the handle 48 effects operation of the camera seat 6 to vertically adjust the camera thereon, and horizontal movement of the handle 48 effects operation of the turntable 3 to horizontally adjust the camera, it being observed that both movements may be effected at the same time or separately, the control of each movement being entirely independent of the other.

Preferably, the arrangement is such that movement of the handle 48 from its neutral position, in which neither the camera seat 6 or the turntable 3 is operated, effects a corresponding movement of the camera.

In order that the control handle 48 may be yieldably urged into and normally maintained in the aforementioned neutral position two pairs of opposing limit stop spring devices 56, of usual construction, are mounted in recesses in the top wall of the upper frame part 21 and operate on studs 57 secured on respective of the arms 42 and 43 to yieldably urge and normally maintain these arms in their neutral positions. See Figures 7 and 9.

In order that the speed of the motor 23 may be controlled an adjustable centrifugal governor 58 is carried within the enclosure of the frame and is driven from the motor shaft 25 through spiral gearing 59. See Figure 3.

While I have described and shown the preferred embodiment of my invention I do not wish to be limited to the precise details of construction as changes may readily be made without departing from the spirit of my invention, but having thus described my invention, I claim as new and desire to secure by Letters Patent the following:

1. In a device of the character described the combination with a frame, of means on said frame for detachably securing the same on the turntable of a tripod head, a pair of parallel shafts on said frame adapted for driving alined operating shafts of the tripod head, an electric motor on said frame, means on said frame for driving said first mentioned pair of shafts from said motor and adapted for adjustment to vary independently the driving of these shafts, and manually actuated means on said frame for adjusting said driving means to vary independently the driving of said first mentioned pair of shafts.

2. In a device of the character described the combination with an enclosing frame, of means on said frame for detachably securing the same on the turntable of a tripod head including a channel on the frame adapted to embrace a trunnion upright on the turntable and releasable means for clamping the trunnion upright in said channel, a pair of parallel shafts on said frame adapted for driving alined operating shafts of the tripod head, an electric motor within said frame, means within said frame for driving said first mentioned pair of shafts from said motor and adapted for adjustment to vary independently the driving of these shafts, and manually actuated means on said frame for adjusting said driving means to vary independently the driving of said first mentioned pair of shafts.

3. In a device of the character described the combination with a frame, of means on said frame for detachably securing the same on the turntable of a tripod head, a pair of parallel shafts on said frame adapted for driving alined operating shafts of the tripod head, an electric motor on said frame and disposed on an axis transverse to the axes of said first mentioned shafts, friction members disposed at the ends of the shaft of said motor and secured therewith and provided with axially outwardly facing friction faces, a second pair of parallel shafts on said frame outwardly beyond respective of said friction faces and disposed normal to said motor shaft, reduction gear driving connections between said second pair of shafts and respective of said first mentioned pair of shafts, a pair of friction wheels keyed on respective of said second pair of shafts for movement therealong and frictionally engaged with respective of said friction faces, and manually actuated means on said frame for adjusting independently said friction wheels along said second pair of shafts to vary independently the driving of the same.

4. In a device of the character described the combination with a member mounted for universal pivotal movement, of power means, two transmission devices for simultaneously and selectively operating said member from said power means in different planes of said movement, a manually operable control member mounted for universal pivotal movement, and means whereby movement of said control member in one plane controls one of said devices and movement of said control member in another plane controls the other of said devices.

5. In a device of the character described the combination with a member mounted for universal pivotal movement of power means, two transmission devices for simultaneously and selectively operating said member from said power means in either direction and in different planes of said movement, a manually operable control member mounted for universal pivotal movement, and means whereby movement of said control member in one plane controls one of said devices and movement of said control member in another plane controls the other of said devices, said devices being inoperative at a central position of said control member.

6. In a device of the character described the combination with a member mounted for universal pivotal movement, of power means, variable speed friction means for simultaneously and selectively operating said member from said power means in either direction and in different planes, a manually operable control member mounted for universal pivotal movement, means whereby said operating means is under the control of said control member to effect movement of said first mentioned member with corresponding movement of said control member, and to vary the speed of movement of said first mentioned member, said means being inoperative at a central position of said control member, and yieldable means for operating said control member into and normally maintaining the same in said central position.

In witness whereof I hereunto affix my signature this 8th day of September, 1928.

ALBERT S. HOWELL.